United States Patent [19]

Rozenblatt et al.

[11] Patent Number: 5,232,010
[45] Date of Patent: Aug. 3, 1993

[54] DRAIN VALVE

[75] Inventors: Mike M. Rozenblatt, Manhattan Beach; Andrew L. Volpe, Lawndale, both of Calif.

[73] Assignee: MAG Aerospace Industries, Inc., Compton, Calif.

[21] Appl. No.: 669,202

[22] Filed: Mar. 14, 1991

Related U.S. Application Data

[62] Division of Ser. No. 533,421, Jun. 5, 1990, Pat. No. 5,035,011.

[51] Int. Cl.⁵ .................. B60N 3/00; F16K 31/165
[52] U.S. Cl. ........................... 137/347; 137/87; 137/899.2; 4/323; 251/58; 251/61
[58] Field of Search ........... 137/87, 183, 204, 505.13, 137/899.2, 347; 4/378, 321, 323; 251/61, 58, 61.2, 61.4

[56] References Cited

U.S. PATENT DOCUMENTS

| | | | |
|---|---|---|---|
| 799,500 | 9/1905 | Squires | 137/87 |
| 2,162,549 | 6/1939 | Frankford | 137/204 |
| 2,399,996 | 5/1946 | Fitch | 137/204 |
| 3,592,958 | 7/1971 | Mueller | 251/61.4 |
| 3,963,040 | 6/1976 | Gezari | 137/899.2 |
| 3,970,280 | 7/1976 | Kunz | 251/58 |
| 4,202,061 | 5/1980 | Waters | 4/317 |
| 4,332,041 | 6/1982 | Kristoffersen | 4/323 X |
| 4,573,224 | 3/1986 | Carlton et al. | 251/61.4 |
| 4,584,726 | 4/1986 | Grills et al. | 4/378 |
| 4,882,792 | 11/1989 | Vincent | 4/323 |

FOREIGN PATENT DOCUMENTS

| | | |
|---|---|---|
| 2908679 | 9/1980 | Fed. Rep. of Germany . |
| 14841 | of 1889 | United Kingdom ........ 137/204 |

Primary Examiner—Stephen M. Hepperle
Attorney, Agent, or Firm—Pretty, Schroeder, Brueggemann & Clark

[57] ABSTRACT

A drain valve is provided for connection to a water supply line for draining water in a vacuum flush aircraft sanitation system. The valve comprises a housing having a fluid inlet and a fluid outlet. The housing also includes a pressure chamber with a diaphragm that is normally biased to a first position by a spring when the chamber is depressurized. This allows water to flow from the fluid inlet to the drain outlet and ultimately to a drain mast of the aircraft. When the chamber is pressurized, however, the diaphragm moves to a second position which operates a linkage mechanism that moves a plug against a seat in the drain outlet to close the drain outlet so that rinse water does not drain from the valve's fluid inlet. A sanitation system also is disclosed, in which grey water from the aircraft lavatory sink is collected and transferred under pressure through a rinse line to flush a toilet bowl when the drain valve is closed. The pressurized lines of the aircraft's potable water supply are used to actuate the diaphragm in the drain valve. Importantly, the drain valve always keeps the pressurized potable water separate from the grey water to prevent unwanted contamination of the aircraft's potable water supply. Moreover, draining of the grey water is automatic upon depressurization of the potable water supply lines.

19 Claims, 3 Drawing Sheets

DRAIN VALVE

This is a division of application Ser. No. 533,421, filed Jun. 5, 1990, now U.S. Pat. No. 5,035,011.

BACKGROUND OF THE INVENTION

The present invention relates to flow control valves and, more particularly, to a pressure operated drain valve for draining water in a vehicle sanitation system.

In most vacuum flush aircraft toilet systems, flushing water is supplied to the toilet bowl by a water supply line connected between the bowl and a water tank containing the aircraft's potable water supply. However, using the potable water supply of the aircraft to flush toilets is not an efficient use of the water. Under present airline standards, approximately eight ounces of water is removed from the potable water supply for each bowl flushing operation. Since aircraft toilets are flushed dozens and dozens of times each flight, the use of potable water is significant and adds excess and unwanted weight to the aircraft. It also limits the use of potable water for other necessary functions in the aircraft and increases fuel consumption.

In order to minimize the use of potable water to flush the toilet bowl, it was discovered that used wash water from the lavatory sinks could be collected and reused for flushing purposes. As a result, a need has arisen for a system to reuse this wash water, commonly referred to as "grey water", for flushing toilet bowls. In the process of reusing the sink wash water it is important that the grey water never enter and thereby contaminate the supply lines containing potable water. Accordingly, appropriate precautions must be taken to ensure that the grey water is always kept separate from the potable water.

In designing a sanitation system that uses grey water, it is desirable to incorporate some type of drain valve for draining the grey water from the lines. In general, the grey water drain valve must be closed when the water supply lines of the aircraft sanitation system have been pressurized, to thereby allow the system to function properly when in use. The drain valve also must be capable of draining the grey water in the lines when the water supply lines are depressurized and the system is not in use. Draining all of the water in the lines is of special concern in situations where the aircraft will not be used and is stored in an environment subject to freezing temperatures. In these situations, the water supply lines in the aircraft will not be pressurized and it is necessary to drain all water from the supply lines. If the lines are not properly drained, freezing temperatures within the aircraft cabin during parking or storage of the aircraft can cause any water remaining in the lines to freeze, and thereby expand and possibly burst the lines. At best, the frozen water may be difficult to thaw and, therefore, may unduly delay or prevent operation of the sanitation system upon reactivating the aircraft. Since the grey water used to flush the toilet bowl ultimately comes from the potable water supply tank, antifreeze additives or the like cannot be put into the water to prevent freezing without contaminating the water and preventing its other necessary uses within the aircraft.

Accordingly, there has existed a definite need for a drain valve which closes when the water supply lines are pressurized to allow grey water to be used for flushing purposes, and which will conveniently drain the grey water in the line when the system is not pressurized. There also has existed a need for a drain valve that maintains the potable water and grey water separate from each other at all times. The present invention satisfies these needs and provides further related advantages.

SUMMARY OF THE INVENTION

The present invention provides a drain valve for draining grey water used for flushing a toilet bowl in a sanitation system in a vehicle, such as an aircraft or train. The drain valve has a unique valve closing feature that is operated in response to pressurization and depressurization of the vehicle's potable water supply lines. When the supply lines are pressurized, the drain valve closes to block flow through the valve so that grey water may be used to flush waste from the toilet bowl. When the supply lines of the system are depressurized, the drain valve opens to allow grey water to drain from the system. The drain valve of the present invention is intended to be simple to operate, reliable in use, relatively inexpensive to manufacture, and without requiring any significant maintenance.

The drain valve comprises a valve housing having a fluid inlet and a drain outlet. The fluid inlet allows grey water from the sanitation system to drain into a fluid chamber in the housing. The drain outlet also is in fluid communication with the fluid chamber. When the drain outlet is closed, water remains but is not allowed to drain from the fluid inlet. When the drain outlet is open, however, water is allowed to enter the drain outlet where it is directed to a drain mast of the aircraft.

The drain valve also includes a pressure chamber within the housing, separate from the fluid chamber, having a pressure responsive member adapted to move between a first position and a second position. In the preferred embodiment, the pressure responsive member comprises a diaphragm made of a flexible elastomeric material. The diaphragm is normally biased to the first position by a spring, in which the valve is normally open to allow draining when the sanitation system is not in use. As described below, movement of the diaphragm caused by the introduction of pressure within the pressure chamber controls the opening and closing of the drain valve.

In accordance with the invention, a pressure inlet in the housing allows pressure to flow into the pressure chamber to move the diaphragm from the first position in which the drain valve is open to the second position in which it is closed. The pressure for carrying out this movement is conveniently supplied by the pressurized water lines of the aircraft's potable water supply. Movement of the diaphragm to the second position actuates a linkage member that moves a plug to a closed position blocking flow through the drain outlet. In the preferred embodiment, the plug is adapted to move into sealed engagement with a valve seat surrounding the drain outlet.

In one aspect of the invention, the drain valve is incorporated into the sanitation system of a vehicle, such as an aircraft, designed to reuse the grey water of the aircraft. In the preferred embodiment, the sanitation system is of the vacuum flush type and comprises a collection tank for holding used wash water which drains from a sink in the aircraft's lavatory. Water from the tank is transferred through a rinse line to a toilet bowl for flushing purposes. Specifically, a pump in the rinse line pumps water from the collection tank to the toilet bowl, while the closed drain valve prevents draining of the grey water from the system.

In another aspect of the invention, the wash water passes through a filter in the collection tank before entering the rinse line that leads to the toilet bowl. Debris collected on the filter is washed downwardly to an overflow line in the collection tank leading to the drain mast of the aircraft. The overflow line also drains wash water from the tank when the volume of water in the tank reaches a predetermined high level. When the volume of wash water in the tank has reached a predetermined low level, however, a liquid level sensor in the collection tank sends a signal to a toilet control module which actuates a fill valve in the pressurized potable water supply line of the aircraft that opens and closes to allow water to be added to the collection tank.

The drain valve of this invention advantageously maintains an extremely effective fluid tight barrier between the potable water which actuates the valve and the grey water which drains from it. Moreover, no control mechanism or other steps are needed to ensure that the valve closes, as the drain valve will automatically close when the potable water supply lines of the aircraft ar pressurized to activate the sanitation system in the usual manner. Similarly, because the drain valve automatically opens when the water supply line is depressurized, no control device or other steps are needed to drain the grey water trapped in the rinse lines when it is desired to drain and deactivate the system.

The drain valve and sanitation system of this invention possess all of the important characteristics necessary to provide for proper operation and maintenance of most vacuum flush aircraft toilet systems. As noted above, the valve closes as soon as the water supply line has been pressurized, thus allowing normal operation of the system. The valve also is self-draining when the supply line is depressurized, which is particularly important when the aircraft will not be used and is stored in freezing weather. Since all the water in the rinse lines upstream of the valve will drain, there is no danger of a water supply line expanding and possibly bursting from trapped frozen water. Moreover, since there is no frozen water that needs to be thawed upon reactivating the aircraft, there will be no delays in operating the sanitation system.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
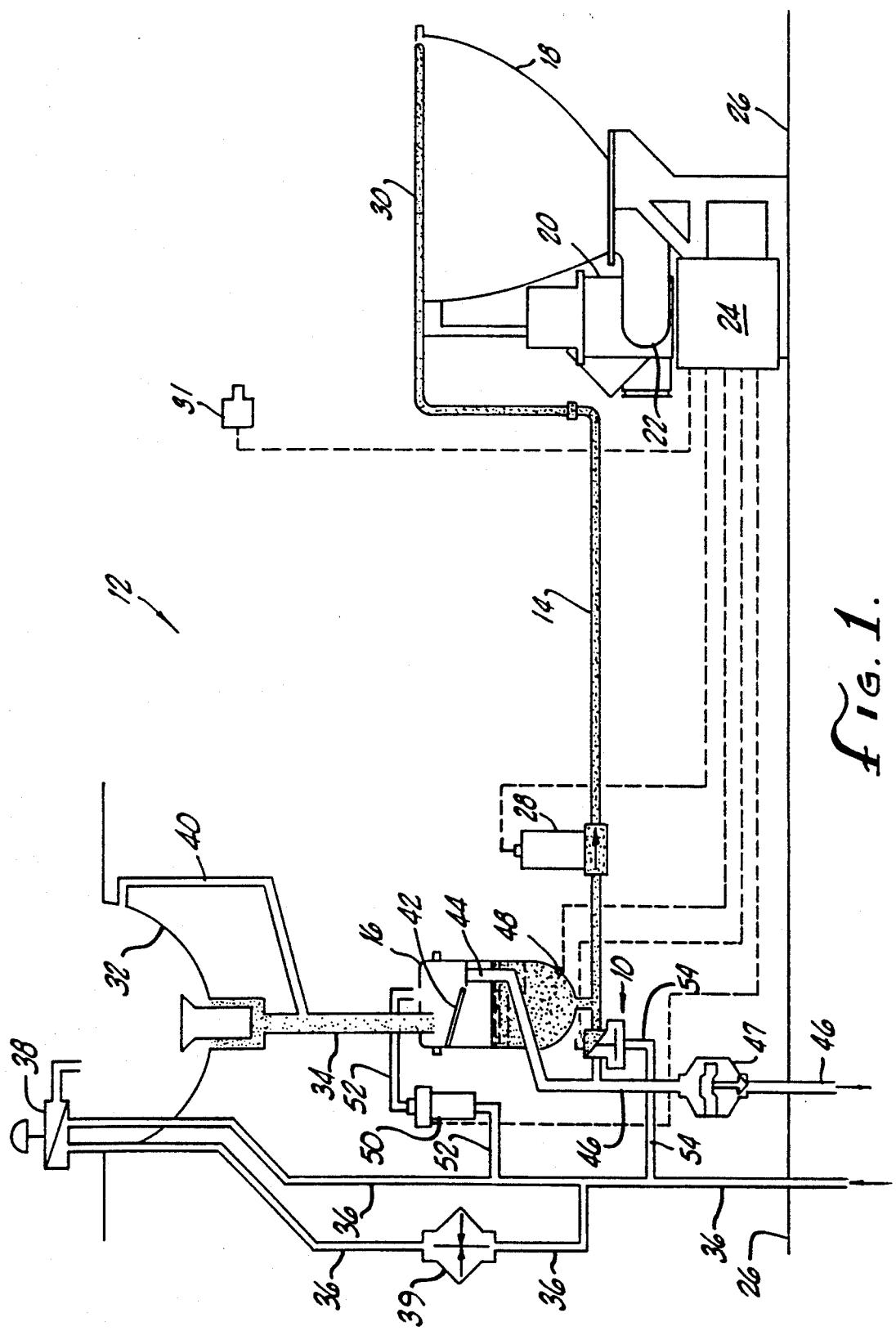
FIG. 1 is a diagrammatic illustration of an aircraft sanitation system incorporating a drain valve embodying the novel features of the invention, shown connected between a grey water collection tank and a toilet bowl of the system.

As shown in the exemplary drawings, the present invention is embodied in a drain valve, referred to generally by the reference numeral 10, for use in draining used wash water, referred to as grey water, from a collection tank and associated supply lines in a vehicle sanitation system 12. The drain valve has a unique valve closing feature that is operated in response to pressurization and depressurization using the vehicle's potable water supply lines. When the potable water lines, referred to as supply lines, are pressurized, the drain valve closes to block flow through the drain valve so that grey water may flow from the collection tank to flush waste from a toilet bowl. When the supply lines are depressurized, the drain valve opens to allow grey water to drain through the valve. Importantly, the drain valve always maintains a fluid tight barrier between the potable water which operates the valve and the grey water which drains from it, to thereby prevent contamination of the vehicle's potable water supply. Moreover, no electrical inputs or manual operation are necessary.

FIG. 1 shows the drain valve 10 of the present invention connected to a rinse line 14 adapted to supply grey water from a collection tank 16 to a toilet bowl 18 in the passenger cabin area of an aircraft. The valve 10 may be incorporated in various types of aircraft, train or other vehicular sanitation systems, in which water flow under pressure from a supply tank to a toilet bowl is required. The drain valve 10 of the present invention has been illustrated in FIG. 1 in an aircraft sanitation system of the vacuum flush type. In such vacuum systems, the toilet bowl 18 is connected to a waste holding tank (not shown) which is under vacuum. A toilet flush valve 20 in a normally closed position is connected in a drain line 22 between the toilet bowl 18 and the waste holding tank to temporarily open and allow vacuum from the waste holding tank to forcibly withdraw waste from the bowl. As described in more detail below, the sanitation system 12 illustrated in FIG. 1 also includes a toilet control module 24 for regulating various aspects of the sanitation system.

The toilet bowl 18 is located in the pressurized cabin of the aircraft above the cabin floor 26. The waste holding tank preferably is situated below the passenger cabin floor 26 at a location that permits access to the waste tank for servicing and emptying after each flight, or as required. The waste tank is vented to the atmosphere in the usual manner to create a pressure differential at sufficiently high altitudes and thereby create vacuum in the drain line 22. This vacuum causes air to flow in a direction through the drain line 22 from the bowl 18 to the waste holding tank for withdrawing waste in the bowl. A vacuum pump (also not shown) may be used to artificially create or supplement the vacuum in the waste holding tank as necessary.

Rinse water for the toilet bowl 18 is provided from the grey water collection tank 16 through the rinse line 14. Passage of the rinse water from the collection tank 16 to the toilet bowl 18 is controlled by a pump 28 which pressurizes the rinse line 14 to the toilet. As the grey water is pumped through the rinse line 14, it reaches the bowl 18 where it is directed through a spray manifold arrangement 30 in the upper portion of the bowl and ejected through a plurality of spray nozzles or the like spaced apart on the spray manifold and thereby rinsing the bowl. During a flush cycle, initiated by depressing a flush switch 31, the rinse water and waste are forcibly drawn through the drain line 22 and into the waste holding tank upon opening of the toilet bowl flush valve 20.

Sequencing of a flush cycle is controlled by the toilet control module 24, which is activated by the flush switch 31 depressed by an occupant In use, the toilet control module 24 sends a first signal for operating the vacuum pump, if necessary, to ensure that sufficient vacuum is present in the waste-holding tank. A second signal also is sent to the pump 28 for pumping a predetermined volume of water through the rinse line 14 into the toilet bowl 18. Another signal simultaneously is sent to the toilet bowl flush valve 20 for opening the flush valve for a predetermined period and evacuating waste and rinse water from the bowl 18. After the flush valve 20 closes, the toilet control module 24 sends another signal to shut off the vacuum pump, if it was operated previously. The toilet 18 is then ready for the next flushing cycle. Additional routing details of the operation of the sanitation system described above will be apparent to those of ordinary skill in the art. Therefore, those details will not be discussed further in this application.

As noted above, the sanitation system 12 incorporating the drain valve 10 of the present invention utilizes grey water in the form of used sink wash water that drains from a lavatory sink 32 through a drain line 34 to the collection tank 16. Potable water is supplied to the sink 32 by a pressurized supply line 36 which may be opened and closed by a faucet 38. A heater 39 may be included to provide hot water to the sink 32 through on of the supply lines 36. The sink 32 also may be provided with a sink overflow line 40, as is conventional. As the sink 32 is used, the wash water will be channeled into and retained by the collection tank 16. Although the collection tank 16 illustrated in FIG. 1 obtains its grey water supply from the aircraft's lavatory sinks, it will be appreciated that other sources of grey water exist in the aircraft and may be used to fill the collection tank 16.

As the grey water drains into the collection tank 16, it passes through a filter 42 adapted to separate particulate matter and other debris and prevent it from entering the tank. The filter 42 preferably comprises a removable screen positioned at the upper portion of the tank 16 above its maximum fluid capacity. Removability of the screen 42 by a snap arrangement or the like allows for easy removal for maintenance or replacement. The filter 42 is mounted at a downward angle such that the grey water is introduced at the upper part of the filter so filtered matter will move downwardly toward a tank overflow line 44 leading to a grey water drain mast 46 of the aircraft. Thus, the filter 42 screens out most debris from the grey water, and the excess water washes the debris off the filter and into the overflow line 44. The drain mast 46 preferably includes an anti-suction type of drain mechanism 47 that is normally closed in the absence of draining water. In this normally closed position, the drain mechanism 47 prevents sucking noises caused by vacuum present in the drain mast 46 during flight. However, when water is present in the drain mechanism 47, it opens to allow water to drain through the drain mast 46 to the exterior of the aircraft.

When the collection tank 16 becomes too full, excess grey water drains into the tank overflow line 44 and out of the aircraft through the drain mast 46. When the volume of grey water in the collection tank 16 becomes too low, however, a liquid level sensor 48 in the bottom of the collection tank 16 detects the low water level and sends a signal to the toilet control module 24 which, in turn, sends another signal to a solenoid fill valve 50 in a fill line 52 branching off of the potable water supply line 36 of the aircraft. This signal actuates the solenoid fill valve 50 which temporarily opens the fill line 52 for a predetermined period of time to allow potable water to enter the collection tank 16 so that sufficient water will be available in the tank at all times during system operation for adequate rinsing purposes.

The solenoid fill valve 50 is a normally closed valve installed in the fill line 52 to precharge the collection tank 16 and to refill it when the water level in it is below the minimum required. The valve 50 has two valve closing features. One closes the valve 50 at just above zero psi, yet allows for self draining when the potable water system is depressurized. The other temporarily opens the valve 50 to allow water to flow through the fill line 52 to the tank 16. A valve of this type is disclosed and claimed in U.S. application Ser. No. 507,383.

In accordance with the invention, the pressure responsive drain valve 10 is connected between the rinse line 14 and the drain mast 46 to permit the flow of water through the rinse line 14 when the potable water supply lines 36 are pressurized, and to drain the rinse line 14 and collection tank 16 when the supply lines 36 are depressurized. Pressure for operating the drain valve 10 is supplied by a pressure line 54 branching off of the potable water supply line 36 which is connected to a pressure inlet 55 of the valve 10. Pressure of about 5 psi is sufficient to actuate the drain valve 10, a value far below the normal operating pressure of a typical aircraft potable water system.

Figure 2:
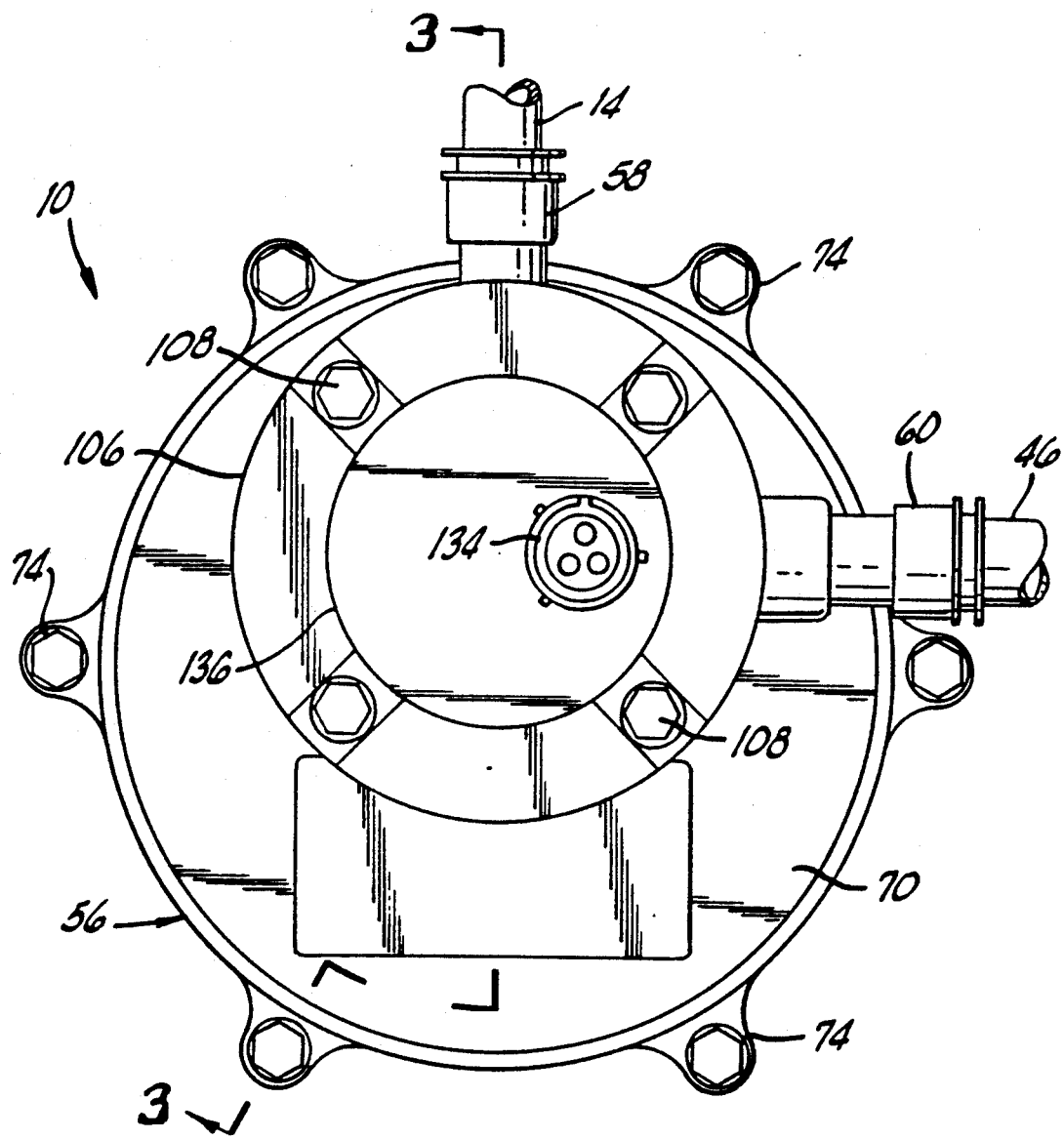
FIG. 2 is a plan view of the drain valve.
Figure 3:
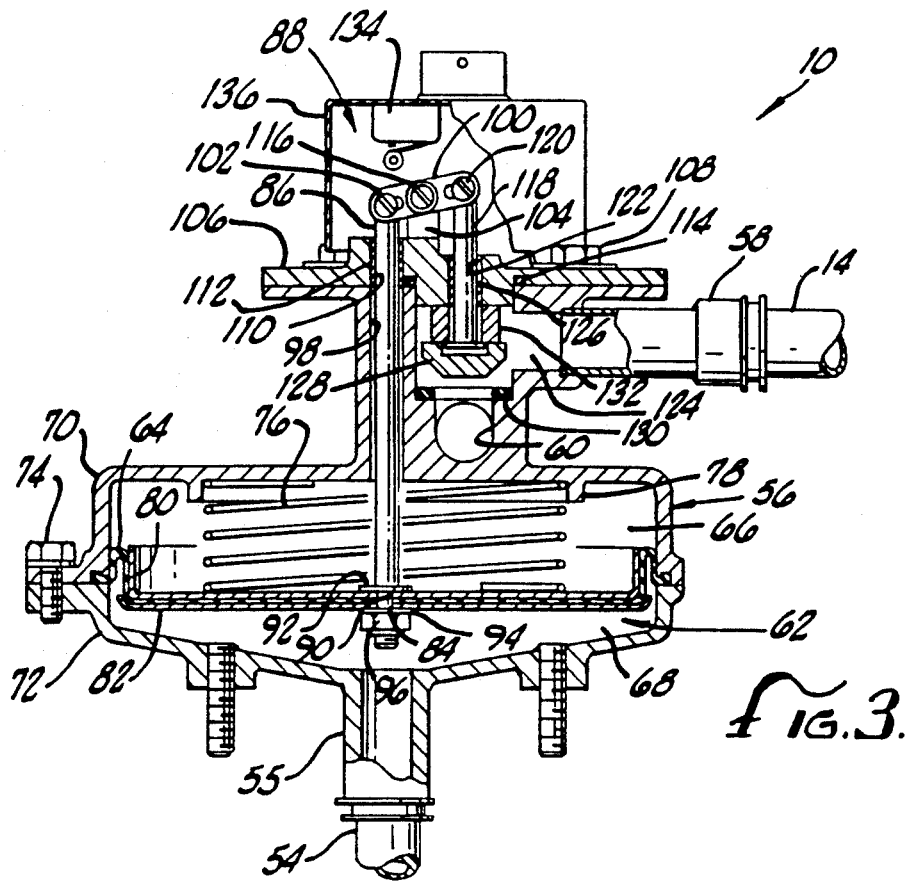
FIG. 3 is a cross-sectional view of the drain valve, taken substantially along line 3—3 of FIG. 2, showing the valve in the open position.
Figure 4:
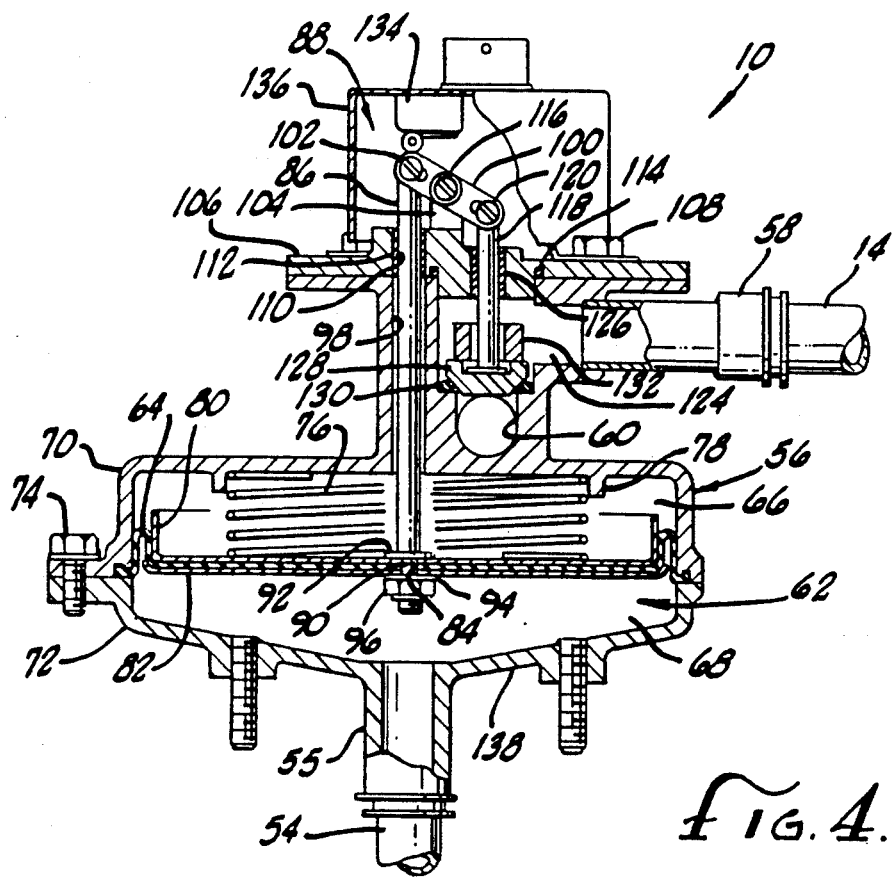
FIG. 4 is another cross-sectional view of the valve, similar to FIG. 3, showing the valve in a closed position.

As shown in FIGS. 2-4, the drain valve 10 includes a housing 56 with a fluid inlet 58 and a drain outlet 60. The fluid inlet 58 is connected to the rinse line 14 and the drain outlet 60 is connected to the drain mast 46. The lower portion of the housing 56 includes a pressure chamber 62 having a pressure responsive member 64 that is moved in response to pressure introduced through the pressure line 54. As noted above, this pressure line 54 supplies water under pressure from the aircraft's potable water supply line 36.

The pressure responsive member 64 comprises a flexible diaphragm separating the pressure chamber 62 into an upper portion 66 and a lower portion 68. More specifically, the outer edges of the diaphragm 64 are clamped between an upper housing section 70 and a lower housing section 72 forming the pressure chamber 62. These two sections 70 and 72 are fastened together by screws 74 or other appropriate fastening means. The diaphragm 64 preferably is constructed from a flexible elastomeric material, such as rubber.

A spring 76 in the upper portion 66 of the pressure chamber 62 normally biases the diaphragm 64 downwardly to a first position. One end of the spring 76 acts against the surface of the upper housing section 70 and is retained in position by an annular lip 78 on the housing 56 corresponding to the diameter of the spring. The other end of the spring 76 acts against a cup 80 positioned between the spring and the upper surface of the diaphragm 64. The cup 80 is made from a rigid material so that the force of the spring 76 does not deform the diaphragm 64. A rigid backing member 82 also is provided on the underside of the diaphragm 64 opposite the cup 80 to provide additional structural support to the diaphragm so that fluid pressure from the pressure line 54 also does not distort the diaphragm. The cup 80 and backing member 82 further ar designed to prevent stress concentrations from developing in the diaphragm 64 that could cause it to prematurely rupture during use.

The diaphragm 64, cup 80, and backing member 82 each have a concentric hole 84 adapted to receive one end of a rod 86 forming a part of a linkage assembly 88 of the drain valve 10. The rod 86 has a neck 90 that passes through these concentric holes 84. The rod 86 is connected to the diaphragm 64 by an upper washer 92 between the cup 80 and the upper end of the neck 90 and a lower washer 94 between the backing member 82 and a threaded nut 96. When the nut 96 is tightened, it clamps the washers 92 and 94 against the cup 80 and backing member 82 and secures the diaphragm 64 to the rod 86. The rod 86 extends upwardly through a bore 98 in the upper housing section 70 and has its other end connected to one end of a link 100 by a fastener 102. The link 100 is pivotally supported by a fulcrum 104 extending upwardly from a cap 106 forming the top part of the housing 56. The cap 106 is connected to the upper housing section 70 by appropriate fasteners 108 and includes a bushing 110 in a bore 112 surrounding the rod 86 to act as a guide for the rod through the cap. A seal 114, such as an elastomeric O-ring, is provided between the cap 106 and the upper housing section 70 to prevent undesirable leakage of grey water.

The link 100 is rotatably connected to the fulcrum 104 by a pin 116, while the other end of the link 100 opposite the rod 86 is connected to a plunger 118 by an appropriate fastener 120 The plunger 118 passes downwardly through another bore 122 in the cap 106 and into a fluid chamber 124 connecting the fluid inlet 58 to the drain outlet 60. A seal 126 is provided around the plunger 118 to prevent leakage of grey water from the fluid chamber 124. The lower portion of the plunger 118 includes a plug 128 adapted to move against a valve seat 130 surrounding the drain outlet 60 of the housing 56. The plug 128 preferably is constructed from a rigid material, while the valve seat 130 is constructed from an elastomeric material, such as rubber, to provide a fluid tight seal when the plug 128 is seated against the seat 130. When the plug 128 is spaced from the valve seat 130, as shown in FIG. 3, the fluid inlet 58 is in fluid communication with the drain outlet 60. However, when the plug 128 is seated against the valve seat 130, as shown in FIG. 4, the drain outlet 60 is closed and not in fluid communication with the fluid inlet 58. The plunger 118 also has a stop 132 above the plug 128 to limit upward travel of the plunger when the potable water supply lines 36 are depressurized and the spring 76 moves the diaphragm 64 to the first position.

Operation of the drain valve 10 and sanitation system 12 of the present invention will now be described. The sanitation system 12 will be activated upon pressurization of the potable water supply lines 36, causing potable water to flow into the pressure line 54 and fill line 52 branching off of the main supply line 36 leading to the sink's faucet 38. As soon as the pressure in the pressure line 54 reaches about 5 psi, the diaphragm 64 will have moved from the first position in which the plug 128 is normally spaced from the valve seat 130, as shown in FIG. 3, to a second position in which the plug 128 is snugly seated against the seat 130, as shown in FIG. 4. In this second position of the diaphragm 64, all flow through the drain outlet 60 is prevented.

More specifically, as the diaphragm 64 moves upwardly in response to fluid pressure from the pressure line 54, the spring 76 compresses and the rod 86 moves upwardly. Air within the upper portion 66 of the pressure chamber 62 is allowed to escape through the spaces between the rod 86, bushing 110 and bore 112. When the drain valve 10 is completely closed, the rod 86 depresses a limit switch 134 which sends a signal to the control module 24 providing a valve closed indication. This information is used by the control module 24 to enable actuation of the solenoid fill valve 50. Until the limit switch 134 is depressed, the solenoid fill valve 50 is disabled to prevent potable water from entering the collection tank 16 and draining out of the drain outlet 60. A protective cover 136 is provided to shield the limit switch 134 and upper portion of the linkage assembly 88 from the elements.

Once the drain valve 10 is closed, and assuming the collection tank 16 is empty, the liquid level sensor 48 will send a signal to the control module 24 indicating that water is needed in the collection tank 16. The control module 24 will then send another signal to the solenoid fill valve 50 to open the fill line 52 for a predetermined period of time to precharge the tank 16. When the water level passes the liquid level sensor 48, the sensor will send another signal to the control module 24 and, after another elapsed time, the control module will close the solenoid fill valve 50 and prevent more potable water from entering the tank 16. At this point, there will be sufficient water available in the collection tank 16 for several rinse cycles of the toilet bowl 18. If the level of water in the collection tank 16 ever becomes too low again, it is understood that the foregoing procedures will be followed to supply additional water to the tank, in the event that sufficient usage of sink water does not occur.

In use, the occupant will depress the flush switch 31 to start a flushing operation, which has been described previously. All this time, while the drain valve 10 remains closed, grey water is allowed to flow through the fluid inlet 58 and into the fluid chamber 124, but not through the closed drain outlet 60.

When it is desired to deactivate the sanitation system 12, the potable water supply lines 36 will be depressurized. The potable water of the aircraft will then drain in the usual manner from the supply line 36, pressure line 54 and fill line 52 by the force of gravity for drainage from the aircraft. When this occurs, the pressure chamber 62 is depressurized, allowing the spring 76 to move the diaphragm 64 back to the first position shown in FIG. 3. This also moves the rod 86 connected to the diaphragm 64 and spaces the plug 128 from the valve seat 130. Grey water in the rinse line 14 then enters the fluid inlet 58 and fluid chamber 124 where it flows out through the drain outlet 60 to the drain mast 46 for drainage from the aircraft. Thus, all of the grey water in the system 12, including the water in the collection tank 16 and rinse line 14, is conveniently drained by the force of gravity from the aircraft.

Importantly, the drain valve 10 of this invention always maintains a fluid tight barrier between the potable water which actuates the valve and the grey water which drains from it. Since the pressurized potable water supply lines 36 of the aircraft are used to actuate the drain valve 10, no electrical inputs or manual operation are necessary to close the valve. This makes the valve 10 quite simple in operation, yet extremely reliable in use. Maintaining this fluid tight barrier between the grey water and potable water is extremely important to ensure purity of the potable water supply. The physical separation provided by the drain valve 10 of this invention is so secure that even a fluid leak in one of the seals 114 or 126 would not allow the leaking grey water to enter the pressure chamber 62, either in the upper portion 66 of the chamber or the lower portion 68. In fact, to enter the lower portion 68 of the pressure chamber 62 where the potable water is present would require a rupture in the diaphragm 64, which is made extremely unlikely by the strength of the diaphragm itself, and as further structurally supported by the rigid cup 60 and backing member 80. Thus, contamination of the potable water in the unlikely event of a valve malfunction is practically impossible.

By automatically opening when the potable water supply lines 36 are depressurized, the drain valve 10 conveniently drains all of the grey water in the system. No control device or other steps are needed to drain the water trapped in the collection tank 16 and rinse line 14 when it is desired to drain and deactivate the sanitation system 12. This is because the drain valve 10 automatically opens when the potable water supply line 36 is depressurized. As a result, no water remains trapped in the collection tank 16, the rinse line 14 or the drain valve 10 itself when the system 12 is depressurized. When the aircraft is stored in freezing weather, therefore, there is no concern that water will be trapped in the rinse line 14 or collection tank 16 and thereby expand and possibly burst the line or damage the valve. Moreover, reactivating the aircraft and the sanitation system 12 can be done very quickly since there will be no frozen water that needs to be thawed.

Special structural features of the valve 10 permit the advantageous self-draining functions describe above. In particular, the drain outlet 60 is located below the fluid inlet 58 so that water automatically drains by the force of gravity from the inlet 58 to the outlet 60, with no water being trapped in the fluid chamber 124. It also will be noted that the bottom wall 138 of the lower housing section 72 is angled downwardly to a point where it converges with the pressure inlet 55. Thus, the potable water that enters the lower portion 68 of the pressure chamber 62 to actuate the diaphragm 64 readily drains from the pressure chamber through the pressure line 54 when the potable water supply lines 36 are depressurized. As a result, the drain valve 10 is completely self-draining and is virtually trouble free.

By using grey water for rinsing the toilet bowl 18, use of the valuable potable water is minimized. Recycling the potable water in accordance with the sanitation system 12 of this invention is efficient and environmentally sound. Moreover, by reusing the potable water in this manner, excess and unwanted weight on the aircraft is minimized. This translates into better fuel economy. It also allows the use of potable water for other necessary functions in the aircraft.

From the foregoing, it will be appreciated that the drain valve 10 of the present invention provides a reliable flow control mechanism that is actuated by the pressurized supply lines 36 of the aircraft's potable water supply. When the supply lines 36 are pressurized, the flow control mechanism closes the drain valve 10 and allows grey water in the vacuum flush system to be used in the usual manner for rinsing purposes. When the supply lines are depressurized, a spring 76 moves the flow control mechanism to open the valve 10 and permit draining of the grey water from the system.

While a particular form of the invention has been illustrated and described, it will be apparent that various modifications can be made without departing from the spirit and scope of the invention. Accordingly, it is not intended that the invention be limited, except as by the appended claims.

We claim:
1. A drain valve, comprising:
   (a) a valve housing;
   (b) a fluid inlet for allowing fluid to enter the housing;
   (c) a drain outlet for allowing fluid to drain out of the housing;
   (d) a pressure chamber within the housing having a pressure responsive member adapted to move between a first position and a second position;
   (e) biasing means for normally biasing the pressure responsive member to the first position;
   (f) a pressure inlet for allowing pressure to flow into the chamber to move the pressure responsive member from the first position to the second position; and
   (g) flow control means for controlling the flow of fluid through the housing, such that when the pressure chamber is pressurized and the pressure responsive member is in the second position, the drain outlet is closed, and such that when the pressure chamber is depressurized and the pressure responsive member is in the first position, the drain outlet is open, and wherein the fluid inlet contains used wash water from a sink in a vehicle sanitation system that is diverted by the drain valve to a rinse line for use in flushing waste from a toilet bowl when the pressure responsive member is in the second position.

2. The drain valve of claim 1, wherein the used wash water in the fluid inlet drains through the housing and out of the drain outlet to a drain mast when the pressure responsive member is in the first position.

3. The drain valve of claim 1, wherein the pressure inlet and pressure chamber are not in fluid communication with either the fluid inlet or the drain outlet.

4. The drain valve of claim 3, wherein the fluid inlet and drain outlet are connected to a fluid chamber in the housing that is sealed and physically separated from the pressure chamber and pressure inlet.

5. The drain valve of claim 4, wherein fluid leakage from the fluid chamber will not enter the pressure chamber or pressure inlet.

6. The drain valve of claim 1, wherein potable water is adapted to flow through the pressure inlet and into the chamber to move the pressure responsive member to the second position.

7. The drain valve of claim 1, wherein the pressure responsive member is a flexible diaphragm.

8. The drain valve of claim 1, wherein the biasing means is a spring.

9. The drain valve of claim 1, wherein the flow control means comprises a linkage mechanism connected to the pressure responsive member and includes a plug that moves to a closed position blocking flow through the drain outlet when the pressure chamber is pressurized and the pressure responsive member is in the second position, and wherein the plug moves to an open position permitting flow through the drain outlet when the pressure chamber is depressurized and the pressure responsive member is in the first position.

10. The drain valve of claim 9, wherein the plug is adapted to move into sealed engagement with a seat surrounding the drain outlet when the pressure chamber is pressurized and the pressure responsive member is in the second position.

11. The drain valve of claim 1, wherein the vehicle is an aircraft or a train.

12. In combination, a vehicle sanitation system and a drain valve incorporated into that system, the drain valve comprising:
  (a) a valve housing;
  (b) a fluid inlet for allowing fluid to enter a fluid chamber in the housing;
  (c) a drain outlet connected to the fluid chamber for allowing fluid from the fluid inlet to drain out of the housing;
  (d) a pressure chamber that is sealed and physically separated at all times from the fluid inlet and the drain outlet;
  (e) a pressure responsive member in the pressure chamber which divides the pressure chamber into an upper portion and a lower portion;
  (f) a spring in the upper portion of the pressure chamber for normally biasing the pressure responsive member to a first position;
  (g) a pressure inlet for allowing pressure to flow into the lower portion of the pressure chamber to move the pressure responsive member from the first position to a second position; and
  (h) flow control means for controlling the flow of fluid through the housing, such that when the lower portion of the pressure chamber is pressurized and the pressure responsive member is in the second position, the drain outlet is closed and, such that when the pressure chamber is depressurized and the pressure responsive member is in the first position, the drain outlet is open.

13. The combination of claim 12, further comprising a linkage mechanism connected to the pressure responsive member for opening and closing the drain outlet, comprising:
  (a) a rod having a first end connected to the pressure responsive member and a second end extending out of the pressure chamber;
  (b) a plunger having a first end with a plug extending into the fluid chamber and a second end extending out the housing;
  (c) a link having one end connected to the second end of the rod and another end connected to the second end of the plunger, wherein the link is pivotally connected to a fulcrum between the two ends of the link; and
  (d) a valve seat in the fluid chamber, wherein the plug is spaced from the valve seat and the drain outlet is open when the pressure responsive member is in the first position, and wherein the plug covers the valve seat and closes the drain outlet when the pressure responsive member is in the second position.

14. The combination of claim 13, wherein the pressure responsive member is a flexible diaphragm.

15. The combination of claim 13, wherein rod and the plunger are substantially parallel to each other.

16. The combination of claim 13, wherein the pressure responsive member overcomes the force of the spring and moves to the second position when the pressure in the lower portion of the pressure chamber reaches approximately 5 psi.

17. The combination of claim 12, wherein the vehicle is an aircraft or a train.

18. The combination of claim 12, wherein the vehicle sanitation system includes a sink, and the fluid inlet contains used wash water from the sink that is diverted by the drain valve to a rinse line for use in flushing waste from a toilet bowl when the pressure responsive member is in the second position.

19. The combination of claim 18, wherein the used wash water in the fluid inlet drains through the housing and out of the drain outlet to a drain mast when the pressure responsive member is in the first position.

* * * * *